United States Patent
Loeffler

(10) Patent No.: US 9,186,701 B2
(45) Date of Patent: Nov. 17, 2015

(54) PROCESS FOR MULTILAYER COATING

(75) Inventor: Helmut Loeffler, Hennef (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 361 days.

(21) Appl. No.: 13/377,213

(22) PCT Filed: Jun. 14, 2010

(86) PCT No.: PCT/US2010/038484
§ 371 (c)(1),
(2), (4) Date: Dec. 9, 2011

(87) PCT Pub. No.: WO2010/144903
PCT Pub. Date: Dec. 16, 2010

(65) Prior Publication Data
US 2012/0082799 A1    Apr. 5, 2012

Related U.S. Application Data

(60) Provisional application No. 61/186,520, filed on Jun. 12, 2009.

(51) Int. Cl.
*C08F 2/46* (2006.01)
*B05D 7/00* (2006.01)
*B05D 3/06* (2006.01)
*C08K 5/50* (2006.01)

(52) U.S. Cl.
CPC .............. *B05D 7/532* (2013.01); *B05D 3/067* (2013.01); *C08K 5/50* (2013.01)

(58) Field of Classification Search
CPC ............ B05D 1/36; B05D 3/067; C08F 2/48; C08F 2/50; C09D 4/00; C09D 775/16
USPC ........................................................ 427/496
See application file for complete search history.

(56) References Cited

U.S. PATENT DOCUMENTS

| | | |
|---|---|---|
| 3,699,022 A | 10/1972 | Behrens et al. |
| 4,116,788 A | 9/1978 | Schmitt et al. |
| 4,985,472 A | 1/1991 | Aosai et al. |
| 5,141,987 A | 8/1992 | Nachtkamp et al. |
| 5,231,131 A | 7/1993 | Chu et al. |
| 5,569,707 A | 10/1996 | Blum et al. |
| 6,077,879 A | 6/2000 | Ohtsuki et al. |
| 6,780,897 B1 | 8/2004 | Blum et al. |
| 7,825,173 B2 | 11/2010 | Willems et al. |
| 7,915,320 B2 | 3/2011 | Sugiura et al. |
| 7,923,113 B2 * | 4/2011 | Dogan et al. ............. 428/423.1 |
| 2001/0034379 A1 * | 10/2001 | Valet ............................. 522/33 |
| 2005/0209359 A1 | 9/2005 | Brand et al. |

FOREIGN PATENT DOCUMENTS

| | | |
|---|---|---|
| CA | 2347868 A1 | 6/2000 |
| JP | S56115304 A | 9/1981 |
| JP | H05161869 A | 6/1993 |
| JP | 2002370249 A | 12/2002 |
| WO | WO 0168736 A1 * | 9/2001 |
| WO | 2006118532 A1 | 11/2006 |
| WO | WO2007068683 A1 * | 6/2007 |

OTHER PUBLICATIONS

Hoyle, C. E., et al., "Thiol-enes: Chemistry of the past with promise for the future," Journal of Polymer Science Part A: Polymer Chemistry, vol. 42, Issue 21, pp. 5301-5338, doi: 10.1002/pola.20366, Nov. 1, 2004.
Morgan, C. R., et al., "UV generated oxygen scavengers and method for determining their effectiveness in photopolymerizable systems," Journal of radiation curing, ISSN 0361-6428, 1983, vol. 10, n4, pp. 4-7.
Schlesing, W., et al., "Dynamic mechanical analysis in coatings industry," Progress in Organic Coatings, vol. 49, Issue 3, Apr. 2004, pp. 197-208.
European Patent Office, Communication pursuant to Article 94(3) EPC, for Patent Application No. 10 728 077.8, mailed Sep. 12, 2013.
European Patent Office, Communication pursuant to Article 94(3) EPC, for Application No. 10 728 077.8, mailed Oct. 1, 2012.
European Patent Office, Communication pursuant to Article 94(3) EPC, for Application No. 10 728 077.8, mailed Apr. 4, 2013.
Japan Patent Office, English Translation of Official Action for Japanese Patent Application No. 2012-515212, mailed Oct. 15, 2013.
International Searching Authority, International Search Report and Written Opinion for International Application No. PCT/US2010/038484, mailed Aug. 20, 2010.
The International Bureau of WIPO, International Preliminary Report on Patentability for International Application No. PCT/US2010/038484, mailed Dec. 22, 2011.
Japan Patent Office, English Translation of Official Action for Japanese Patent Application No. 2012-515212, dated Jun. 26, 2014.

* cited by examiner

*Primary Examiner* — Elena T Lightfoot
(74) *Attorney, Agent, or Firm* — Ingrassia Fisher & Lorenz, P.C.

(57) ABSTRACT

This invention relates to a process for multilayer coating of substrates, comprising the steps: I) applying a layer of a water-based color-imparting and/or special effect-imparting base coat coating composition to a substrate, II) applying a layer of a clear coat coating composition curable by means of high energy radiation and optionally curable by at least one additional chemical curing reaction, and III) curing said clear coat layer by exposing it to high energy radiation, wherein the clear coat coating composition comprises: A) at least one compound capable of free-radical polymerization having at least one olefinically unsaturated group, B) at least one photoinitiator and C) at least one organic phosphine derivative.

13 Claims, No Drawings

PROCESS FOR MULTILAYER COATING

FIELD OF THE INVENTION

The invention relates to a process for multilayer coating of substrates using coating compositions curable by means of high energy radiation. The process can be used in the field of industrial and vehicle coating.

DESCRIPTION OF RELATED ART

It is known to use coating compositions curable by means of high energy radiation, particularly by means of UV (ultraviolet) radiation in industrial and vehicle coating.

This application utilizes the advantages of radiation-curable coating compositions such as, e.g., the very short curing times, the low solvent emission of the coating compositions and the good hardness and mar resistance of the resulting coatings.

Binders used in the coating compositions curable by high-energy radiation are generally those containing olefinically unsaturated groups, in particular (meth)acryloyl groups, and cure by free-radical polymerization initiated by UV radiation. When coating three-dimensional objects, insufficient curing and hence unsatisfactory surface properties may occur in areas that are unexposed or underexposed to UV radiation. In order to overcome these problems, it is also already known to use so-called dual-cure systems in which free-radical polymerization initiated by UV radiation is combined with a further chemical cross-linking mechanism.

Although UV curable systems indisputably have advantageous properties, known compositions curable by means of UV radiation still exhibit several disadvantages.

Almost all radiation-curable binder systems based on the formation of free radicals exhibit the disadvantage of inhibition of the polymerization reaction by atmospheric oxygen, as a result of which the surface of an applied film is not completely cured and then exhibits, for example, inadequate hardness and scratch resistance. The inhibition is caused by the competitive reactions, which occur during free-radical polymerization in the presence of atmospheric oxygen, wherein the oxygen reacts with the free radicals arising at the surface and the latter are no longer available in their entirety for the polymerization reaction.

Various methods have already been developed for avoiding or reducing oxygen inhibition. One possibility is to use chemically modified resins, for example, in the case of unsaturated polyester resins, the inhibition effect may be overcome by incorporation of allyl ether groups. Trimethylolpropane diallyl ether may, for example, be used for this purpose. Another possibility, in principle, is to work in an inert gas atmosphere with exclusion of oxygen. Nitrogen or a carbon dioxide/nitrogen mixture is conventionally used for this purpose. It is also known to avoid oxygen inhibition by adding paraffins or similar waxy substances which form a protective film on the surface.

While the stated approaches do indeed, in principle, solve or minimize the problem of inhibition by atmospheric oxygen, they also cause additional difficulties with regard to process control or achieving certain technological properties of the coatings.

Furthermore, EP 1 382 651 discloses coating compositions containing (meth)acryloyl functional organopolysiloxanes and an antioxidant from the group of phosphorus (III) compounds and/or sulphur containing compounds. Useful phosphorus (III) compounds are those having at least one residue —OR in the molecule, for example, phosphites. Suitable sulphur containing compounds are mercapto compounds.

Also, U.S. Pat. No. 3,699,022 discloses compositions curable by UV radiation based on unsaturated polyester resins and copolymerizable monomeric compounds. The unsaturated polyester resins are obtained by polycondensation from unsaturated dicarboxylic acids or their anhydrides with polyhydric alcohols. The UV curable compositions contain a photoinitator combination consisting of benzoin-ethers and mandatorily two different compounds of trivalent phosphorus. The compounds of trivalent phosphorus consist of organic esters of phosphorous acid and organic phosphine derivatives, preferably in a phosphite to phosphine ratio of about 3:1.

Photopolymerizable compositions containing di- or tri-functional (meth)acrylic acid esters, a benzoin photoinitiator and an organic phosphite are described in U.S. Pat. No. 4,116,788. An acceleration of the polymerization and thus of the hardening of the composition is achieved by means of the combination of organic phosphites and benzoin derivatives as initiator of the polymerization by radiation with ultraviolet light.

A further well known general shortcoming of UV-curable coating compositions is the initial yellowing of the coatings after UV irradiation, with the result that the use of these binder systems in clear coats and top coats, particularly top coats containing pale pigments, e.g., white pigments, is considerably restricted. A distinct initial yellowing occurs when applying UV curable clear coat coating compositions onto water-based coating layers, for example, onto water-based color-imparting and/or special effect-imparting base coat layers, that have not been fully cured when applying the clear coat layer.

All solutions proposed so far were not able to solve the problems of oxygen inhibition and yellowing to a completely satisfactory extent.

Therefore, there is accordingly still a requirement for a process for multilayer coating of substrates including the application of water-based color-imparting and/or special effect-imparting base coat layers and the application of clear coat coating compositions curable by means of UV radiation based on free-radically polymerizable binders, which yield fully cured films with acceptable technological properties without using elaborate methods, such as, for example, working under an inert atmosphere. The process should allow rapid further treatment of the coated surfaces, e.g., by polishing or sanding. Furthermore, the process shall result in coatings with no initial yellowing or at least low initial yellowing after curing, i.e. after UV irradiation, to ensure further application as clear coats or light pigmented topcoats.

SUMMARY OF THE INVENTION

This invention relates to a process for multilayer coating of substrates, comprising the steps:
I) applying a layer of a water-based color-imparting and/or special effect-imparting base coat coating composition to a substrate,
II) applying a layer of a clear coat coating composition curable by means of high energy radiation and optionally by at least one additional chemical curing reaction, and
III) curing said clear coat layer by exposing it to high energy radiation, preferably to UV radiation,
wherein the clear coat coating composition comprises:
  A) at least one compound capable of free-radical polymerization having at least one olefinically unsaturated group, B) at least one photoinitiator and C) at least one organic phosphine derivative, preferably at least one triaryl phosphine, most preferred triphenyl phosphine.

It has been found that the coatings achieved with the process of the present invention have improved solvent and humidity resistance and cure to tack-free coatings. The process allows rapid further treatment of the coated surfaces after curing, e.g., by polishing or sanding. Unexpectedly it has also been found that the coatings exhibit excellent gloss and no or very low initial yellowing after curing, i.e. after radiation with high energy.

DETAILED DESCRIPTION OF THE EMBODIMENTS

The present invention will be explained in more detail below:

It will be appreciated that certain features of the invention which are, for clarity, described above and below in the context of separate embodiments may also be provided in combination in a single embodiment. Conversely, various features of the invention that are, for brevity, described in the context of a single embodiment may also be provided separately or in any sub-combination. In addition, references in the singular may also include the plural (for example, "a" and "an" may refer to one, or one or more) unless the context specifically states otherwise.

The slight variations above and below the stated ranges of numerical values can be used to achieve substantially the same results as values within the ranges. Also, the disclosure of these ranges is intended as a continuous range including every value between the minimum and maximum values.

High-energy radiation is intended to mean UV (ultraviolet) radiation and electron beam radiation. Preferably UV radiation is used as high energy radiation.

(Meth)acryloyl or (meth)acrylic are intended to mean acryloyl and/or methacryloyl or acrylic and/or methacrylic.

All the number or weight average molar mass data stated in the present description are determined or to be determined by gel permeation chromatography (GPC; divinylbenzene-cross-linked polystyrene as the immobile phase, tetrahydrofuran as the liquid phase, polystyrene standards).

Aqueous or water-based coating compositions are coating compositions, wherein water is used as solvent or thinner when preparing and/or applying the coating composition. Usually, aqueous coating compositions contain about 20 to 80% by weight of water, based on the total amount of the coating composition and optionally, up to 15% by weight, preferably, below 10% by weight of organic solvents, based on the total amount of the coating composition.

A color-imparting and/or special effect-imparting base coat coating composition is a coating composition containing colored and special effect pigments that gives a coated substrate a desired color and/or effect A clear coat coating composition is a transparent un-pigmented or with transparent pigments pigmented coating composition that usually is applied in multi-layer coating as the outer coating layer to give the coated substrate a certain protection against external effects.

First of all the clear coat coating compositions applied in step 2 of the process of the present invention shall be explained in more detail.

The clear coat coating compositions are curable by radical polymerization by means of high energy radiation and optionally by at least one additional chemical curing reaction.

The coating compositions contain compounds curable by high energy radiation having at least one olefinically unsaturated group capable of free-radical polymerization (component A). Compounds A) curable by high energy radiation that may be used as component A) comprise any conventional compounds which are curable by free-radical polymerization. The compounds capable of free-radical polymerization have at least one olefinically unsaturated group, preferably 1 to 20, particularly preferably 1 to 10, most preferably 1 to 5 olefinically unsaturated groups per molecule. The compounds may have a C=C equivalent weight from 100 to 10,000, preferably from 200 to 5,000, more preferred from 200 to 3,000.

The person skilled in the art is aware of such compounds and is able to produce them in accordance with conventional methods to achieve the desired functionality. Useful compounds A) are also commercially available.

The compounds capable of free-radical polymerization A) may be in the form of low molar mass compounds defined by empirical and structural formula, for example, with a molar mass in the range of 200 to 600 g/mole, or may be oligomeric or polymeric prepolymers.

The polymerizable olefinically unsaturated groups may, for example, be present in the form of (meth)acryloyl, vinyl, allyl, maleate and/or fumarate groups. Particularly preferred olefinically unsaturated groups are (meth)acryloyl groups. Most preferred olefinically unsaturated groups are (meth)acrylic acid ester groups. The (meth)acryloyl groups or (meth)acrylic acid ester groups may be present in combination with other olefinically unsaturated groups.

Examples of compounds A) are (meth)acryloyl-functional (meth)acrylic copolymers, (meth)acryloyl-functional epoxy resins, (meth)acryloyl-functional polyesters, (meth)acryloyl-functional polyethers, (meth)acryloyl-functional polyurethanes, (meth)acryloyl-functional urethane compounds, (meth)acryloyl-functional amino compounds, (meth)acryloyl-functional melamine resins. Preferred are (meth)acryloyl-functional (meth)acrylic copolymers, (meth)acryloyl-functional polyesters, (meth)acryloyl-functional polyethers, (meth)acryloyl-functional polyurethanes and (meth)acryloyl-functional urethane compounds. The number average molar mass (Mn) of these compounds is preferably in the range from 500 to 8,000 g/mole, more preferred from 700 to 5,000. The preferred compounds A) preferably contain 1 to 20, particularly preferably 1 to 10, most preferably 1 to 5 (meth)acryloyl groups per molecule. Most preferred the (meth)acryloyl groups are (meth)acrylic acid ester groups.

The compounds A) may be used individually or in combination.

The compounds A) capable of free-radical polymerization may comprise also UV curable monomeric reactive diluents. Reactive diluents are reactive, polymerizable liquid monomers that act as solvents in the system and participate in the crosslinking reaction of the coating composition.

UV curable reactive diluents are low molecular weight monomeric compounds capable of free-radical polymerization with a molar mass of, for example, below 500 g/mole. The reactive diluents may be mono-, di- or polyunsaturated monomers. Examples of monounsaturated reactive diluents are: (meth)acrylic acid and esters thereof, maleic acid and half esters thereof, vinyl acetate, vinyl ether, substituted vinyl ureas, styrene, vinyl toluene. Examples of diunsaturated reactive diluents are: di(meth)acrylates, such as alkylene glycol di(meth)acrylate, polyethylene glycol di(meth)acrylate, butane-1,3-diol di(meth)acrylate, vinyl (meth)acrylate, allyl (meth)acrylate, divinyl benzene, dipropylene glycol di(meth) acrylate, hexanediol di(meth)acrylate. Examples of polyunsaturated reactive diluents are: glycerol tri(meth)acrylate, trimethylol propane tri(meth)acrylate, pentaerythritol tri(meth)acrylate, pentaerythritol tetra(meth)acrylate. The reactive diluents may be used individually, or a mixture of a suitable combination of reactive diluents may be used.

The coating composition may contain for example 40 to 70% by weight of low molar mass compounds defined by empirical and structural formula, polymeric and/or oligomeric prepolymers and 30 to 60% by weight of monomeric reactive diluents, based on the total amount of component A). The coating composition may preferably contain for example 70 to 100% by weight of polymeric and/or oligomeric prepolymers and 0 to 30% by weight of monomeric reactive diluents, based on the total amount of component A). The % by weight are based on solids.

Preferably the clear coat coating compositions are curable by radical polymerization by means of high energy radiation and by at least one additional chemical curing reaction.

Therefore, preferred clear coat coating compositions comprise in addition to the at least one olefinically unsaturated group of component A) at least two further complementary reactive functional groups a) and b). Functional groups a) and b) are capable of, e.g., condensation and/or addition reaction with each other. Condensation and/or addition reaction hereby includes polycondensation and/or polyaddition reaction. Those functional groups may be present either in component A) or in further components, for example, in components A1), A2) and/or A3) that are described more detailed below, or in both, in component A) and in the further components.

Generally the following combinations of compounds with functional groups a) and b) are possible, for example.

Combination I: Compound A with olefinically unsaturated groups only; compound A1) with functional groups b); compound A2) with functional groups a).

Combination II: Compound A with olefinically unsaturated groups and with functional groups a); compound A1) with functional groups b); optionally compound A2) with functional groups a).

Combination III: Compound A with olefinically unsaturated groups and with functional groups a); compound A3) with olefinically unsaturated groups and with functional groups b); optionally compound A1) with functional groups b) and/or compound A2) with functional groups a).

Suitable functional groups a) and b) that are reactive with each other by means of condensation or addition reaction are the following combinations: groups containing active hydrogen (e.g. hydroxyl, thiol and/or amino groups) and isocyanate groups, hydroxyl groups and anhydride groups, amino groups and epoxide groups, acetoacetate groups and corresponding reactive groups, such as amino groups and blocked amino groups.

Preferred functional groups a) and b) are groups containing active hydrogen and isocyanate groups. More preferred are hydroxyl and/or thiol groups and isocyanate groups.

Due to the type of functional groups reactive with each other one-component or two-component coating compositions can be formulated.

Preferably two-component coating compositions are formulated More preferred two-component coating compositions are formulated on basis of groups containing active hydrogen and isocyanate groups.

The handling of two-component coating compositions generally requires mixing together the reactive components shortly before application to avoid premature reaction of the reactive components. The term "shortly before application" is well-known to a person skilled in the art working with two-component coating compositions. It defines the time period within which the ready-to-use coating composition may be prepared prior to the actual use/application depends, e.g., on the pot life of the coating composition.

According to a first embodiment clear coat coating compositions curable by radical polymerization by means of high energy radiation and by at least one additional chemical curing reaction are used in the process of this invention, said clear coat coating compositions comprising A) at least one compound capable of free-radical polymerization having at least one olefinically unsaturated group and optionally at least one functional group a) that is reactive towards the at least one functional group b) of compound A1) and/or A3), A1) optionally at least one compound with at least one functional group b) curable by addition and/or condensation reaction, A2) optionally at least one compound with at least one functional group a) that is reactive towards the at least one functional group b) of compound A1) and/or A3), A3) optionally at least one further compound capable of free-radical polymerization having at least one olefinically unsaturated group and at least one functional group b) that is reactive towards the at least one functional group a) of compound A) and/or A2), B) at least one photoinitiator and C) at least one organic phosphine derivative, preferably at least one triaryl phosphine, most preferred triphenyl phosphine, with the proviso that, component A) contains functional groups a) and/or component A2) with functional groups a) is present, and that at least one of components A1) or A3) with functional groups b) is present.

According to a second embodiment clear coat coating compositions curable by radical polymerization by means of high energy radiation and by at least one additional chemical curing reaction are used in the process of this invention, said clear coat coating compositions comprising A) at least one compound capable of free-radical polymerization having at least one olefinically unsaturated group and optionally at least one functional group a) that is reactive towards the at least one functional group of compound A1), A1) at least one compound with at least one functional group b) curable by addition and/or condensation reaction, A2) optionally at least one compound with at least one functional group a) that is reactive towards the at least one functional group b) of compound A1), B) at least one photoinitiator and C) at least one organic phosphine derivative, preferably at least one triaryl phosphine, most preferred triphenyl phosphine, with the proviso that compound A) contains at least one functional group a) that is reactive towards the at least one functional group b) of compound A1), and/or component A2) with functional groups a) is present.

Component A) optionally contains at least one functional group a) that is reactive towards the at least one functional group b) of compound A1) and/or A3).

Those functional groups a) are preferably groups with active hydrogen or isocyanate groups.

Accordingly the olefinally unsaturated compounds A) have been modified with the desired functional groups. The preparation of those compounds, for example (meth)acryloyl and hydroxy-functional compounds A) or (meth)acryloyl and isocyanate-functional compounds A) may be carried out in a manner known to the skilled person. Suitable compounds A) with (meth)acryloyl and hydroxyl groups may be prepared, for example, by preparing initially an epoxy-functional and optionally hydroxy-functional (meth)acrylic copolymer and adding then carboxy-functional unsaturated monomers, e.g., (meth)acrylic acid to at least a part of the epoxy groups in a second step in order to introduce (meth)acryloyl groups into the hydroxyl-functional copolymer. The preparation of the epoxy-functional and optionally hydroxy-functional (meth) acrylic copolymers in the first step may take place by free-radical copolymerization. This may take place in a manner known to the skilled person by conventional methods, particularly by free-radical solution polymerization using radical initiators.

According to the first embodiment of the present invention as described above the coating compositions contain at least one of components A1), A2) and A3).

Components A1) are compounds with reactive functional groups b) that are curable by addition and/or condensation reaction and are complementary reactive towards the functional groups a) of component A) and/or component A2). Compounds A1) may include, for example, isocyanate-functional compounds or compounds with functional groups with active hydrogen, e.g. hydroxyl groups or. Preferably they contain isocyanate-functional compounds.

Compounds A1) with isocyanate groups may be, for example, polyisocyanates with free isocyanate groups. Polyisocyanates with free isocyanate groups are, for example, any organic polyisocyanates with aliphatically, cycloaliphatically, araliphatically and/or aromatically bound free isocyanate groups. The polyisocyanates are liquid at room temperature or liquefied by the addition of organic solvents. The polyisocyanates generally have a viscosity from 1 to 6,000 mPas at 23° C., preferably over 5 and below 3,000 mPas.

Polyisocyanates of this kind are known to the skilled person and described in the literature.

The polyisocyanates are preferably those with an average NCO functionality from 1.5 to 5, preferably 2 to 4.

The so-called "paint (coating) polyisocyanates" are particularly suitable, for example, those based on hexamethylene diisocyanate (HDI), 1-isocyanato-3,3,5-trimethyl-5-isocyanatomethyl-cyclohexane (IPDI) and/or bis(isocyanatocyclohexyl)-methane and the known derivatives of these diisocyanates containing biuret, allophanate, urethane and/or isocyanurate groups from which excess starting diisocyanate is removed after their preparation, preferably by distillation, to a residual content of less than 0.5 wt. %. Triisocyanates such as nonane triisocyanate may also be used.

Sterically hindered polyisocyanates are also suitable. Examples thereof are 1,1,6,6-tetramethyl-hexamethylene diisocyanate, 1,5-dibutyl-pentamethyl diisocyanate, p- or m-tetramethylxylylene diisocyanate and the corresponding hydrogenated homologues.

In principle, diisocyanates may be reacted in the conventional manner to higher functionality compounds, for example, by trimerization or by reaction with water or polyols such as, trimethylolpropane or glycerol.

The polyisocyanates may be used individually or in mixture. These are the conventional polyisocyanate crosslinking agents used in the coatings industry, which are described comprehensively in the literature and are also available as commercial products.

Isocyanate-modified resins, e.g., isocyanate-functional acrylate, polyurethane, polyester and/or epoxy resins may be used in addition to or instead of the above-mentioned polyisocyanates as isocyanate-functional component A1).

Compounds A1) are free of UV-curable olefinically unsaturated groups.

Compounds A2) are compounds with reactive functional groups a) that are complementary reactive towards functional groups b) of compound A1). Compounds A2) may include, for example, compounds with functional groups with active hydrogen, e.g. hydroxyl groups, thiol groups or amino groups, or isocyanate-functional compounds. Preferably they contain compounds with functional groups with active hydrogen, more preferred with hydroxyl groups.

Examples of hydroxy-functional compounds A2) are the hydroxy-functional binders and compounds well-known preparation of two-component coating compositions. The hydroxy-functional binders may be, for example, hydroxy-functional polyester, alkyd, polyurethane, and/or poly(meth)acrylate resins. Also thiol-functional compounds or binders may be used. These binders are sufficiently well known to the skilled person and can be prepared according to know preparation methods.

Compounds A2) are free of UV-curable olefinically unsaturated groups.

Compounds A3) are similar compounds as compounds A) and may include the same compounds with olefinically unsaturated groups capable of free-radical polymerization as compounds A), but with additional reactive functional groups b) that are complementary reactive towards functional groups a) of compounds A) and/or A2).

According to the second embodiment of the present invention as described above the coating compositions contain component A), component A1) and optionally component A2).

In this second embodiment component A) preferably contains compounds with functional groups with active hydrogen and component A1) preferably contains compounds with isocyanate groups. Compounds A1) with isocyanate groups may be the same compounds and preferred compounds A1) as described above in the first embodiment of the present invention.

In this second embodiment component A2), if present, preferably contains compounds having functional groups with active hydrogen, e.g. hydroxyl groups and/or thiol groups. Compounds A2) with groups with active hydrogen may be the same compounds and preferred compounds A2) as described above in the first embodiment of the present invention.

According to a preferred embodiment the coating composition of the present invention contains components A) comprising compounds having hydroxyl groups in addition to the olefinically unsaturated groups and contains as component A1) compounds with isocyanate groups.

Generally, preferred radically polymerizable olefinically unsaturated groups are (meth)acryloyl groups, preferred functional groups a) are hydroxyl group and preferred complementary functional groups b) are isocyanate groups. Also functional groups a) can be isocyanate groups and complentary reactive functional groups b) can be hydroxyl group.

According to a more preferred embodiment of the present invention component A) comprises compounds with functional groups with active hydrogen, in particular comprises compounds with at least one (meth)acryloyl group and at least one hydroxyl group, and component A1) comprises at least one compound with isocyanate groups b). Most preferred component A) comprises a hydroxyl-functional (meth)acryloyl functional polyurethane, a hydroxyl-functional (meth)acryloyl functional urethane compound and/or a hydroxyl-functional (meth)acryloyl functional (meth)acrylic copolymer and component A1) comprises at least one polyisocyanate with free isocyanate groups. In addition further (meth)acryloyl functional compounds may be present. Also, in addition further hydroxyl-functional compounds may be present, that do not contain any radically polymerizable groups, such as (meth)acryloyl groups.

The UV-curable clear coat coating compositions to be used in the process of the present invention contain one or more photoinitiators B) for the radical polymerization of components capably of free-radical polymerization. Suitable photoinitiators include, for example, those that absorb in the wavelength range from 190 to 600 nm. The photoinitiators may be present for example, in quantities of 0.1 to 10.0% by weight, preferably of 0.1 to 5.0% by weight, more preferred of 0.4 to 3.0% relative to the total amount of compounds and reactive diluents capable of free-radical polymerization and photoinitiators. Examples of suitable photoinitiators are benzoin and derivatives thereof, acetophenone and derivatives thereof, for example 2,2-diacetoxyacetophenone, benzophenone and derivatives thereof, thioxanthone and derivatives thereof, anthraquinone, 1-benzoylcyclohexanol, and organophosphorus compounds, such as acylphosphine oxides. The photoinitiators may be used individually or in combination.

The coating compositions according to the invention contain at least one organic phosphine derivative (component C). The organic phosphine derivative is an organic derivative of phosphine ($PH_3$). Preferred phosphine derivatives are trifunctional phosphine derivates, more preferred are triaryl phosphines, most preferred is triphenyl phosphine.

The organic phosphine derivative may be present in the coating composition in amounts of 0.5 to 45% by weight solids, preferably of 3 to 40% by weight solids, most preferred of 5.0 to 30% by weight solids, based on the total amount of weight solids of component A). If in addition to component A) other components with radically polymerizable olefinically unsaturated groups are present in the coating composition, the organic phosphine derivative may be present in the coating composition in amounts of 0.5 to 45% by weight solids, preferably of 3 to 40% by weight solids, most preferred of 5.0 to 30% by weight solids, based on the total amount of weight solids of component A) and the other components with radically polymerizable olefinically unsaturated groups.

The organic phosphine derivative may be dissolved or dispersed in one or more suitable organic solvents. Organic solvents which may be used are, for example, esters, such as ethyl acetate, butyl acetate and other organic solvents.

In addition to the organic phosphine derivative C) other so-called antioxidants may be present. Other antioxidants may be, for example, thiols as described in C. E. Hoyle, T. Y. Lee, T. Roper, *J. of Polym. Sci., Polym. Chem.* 2004, 42, 5301-5328, Amines C. R. Morgan, D. R. Kyle, *J. Rad. Curing* 1983, 4-8.

Also further compounds of trivalent phosphorus, e.g., organic phosphites, may be present in small amounts, for example, in a ratio by weight of phosphine to further compounds of trivalent phosphorus, e.g. phosphites, of 4:1 or less. For example, the organic phosphine derivative may be present in combination with a further compound of trivalent phosphorus in a ratio by weight of organic phosphine to further compound of trivalent phosphorus of 80:20 to 99.5:0.5.

Preferably the coating composition of the present invention is free of organic phosphites.

The organic phosphine derivative C) may be added to the final coating composition or to one of the components of the coating composition. It may be added to anyone of components A), A1), A2) and A3). In case of a two-component coating system the organic phosphine derivative may be added to one of the two components or to both components or may be stored in said components. It is, however, also possible to provide the organic phosphine derivative as a separate component and only to incorporate it as a third component when the two components of the two-component coating system are mixed together.

According to a preferred embodiment, the organic phosphine derivative is stored as a separate component, preferably dissolved or dispersed in an organic solvent, and added when preparing the final coating composition, i.e. when mixing together the components of the two-component coating system.

The clear coat coating compositions may contain additional additives conventionally used in coating compositions. Examples of additives conventionally used in coating compositions are flow control agents, anti-settling agents, adhesion promoting agents and light stabilizer.

The additives are used in conventional quantities known to the person skilled in the art.

The clear coat coating compositions may contain water and/or organic solvents, i.e. they may be organic solvent-based or water-based. The compositions may, however, also take the form of 100% systems without organic solvents and water. The coating compositions may contain for example 0 to 50% by weight of water and/or organic solvents.

The individual steps of the process according to the invention are explained in greater detail below.

In the multilayer coating process according to the invention, in step I a layer of a water-based color-imparting and/or special effect-imparting base coat coating composition is applied onto an optionally pre-coated substrate. Suitable substrates are metal and plastics substrates, in particular the substrates known in the automotive industry, such as for example iron, zinc, aluminium, magnesium, stainless steel or the alloys thereof, together with polyurethanes, polycarbonates or polyolefins. In the case of vehicle body or vehicle body part coating, the water-based base coat compositions are applied, preferably by means of spraying, onto substrates pre-coated in conventional manner.

The substrates, in particular the vehicle bodies or parts thereof are usually already pre-coated before application of the base coat composition. The prior coating may comprise a coating of a filler coating composition, such as is conventionally used in vehicle coating. The filler coating compositions may also perform the function of a filler-primer or priming filler.

In addition to the filler coating composition or instead of it, the prior coating may also comprise, preferably beneath the filler layer, coatings of electrodeposited primers, other primers or further coating compositions.

The filler layer may be cured or dried before application of the water-borne base coat composition. Wet-on-wet application is, however, also possible.

The water-borne base coat composition may also be applied onto an intact existing or original coating.

The water-based base coat composition to be applied in step 1) comprises effect or solid-colour base coat compositions as are conventionally used in vehicle coating.

The water-based base coat compositions contain the conventional constituents of a water-based pigmented base coat composition: color-imparting and/or special effect-imparting pigments, one or more binders, water and optionally at least one of the following constituents: crosslinking agents, fillers, conventional coating additives and organic solvents.

Examples of binders are conventional film-forming, water-dilutable binders familiar to the person skilled in the art, such as water-dilutable polyester resins, water-dilutable (meth) acrylic copolymer resins or water-dilutable polyester/(meth) acrylic copolymer hybrids and water-dilutable polyurethane resins or polyurethane/(meth)acrylic copolymer hybrids. These may be reactive or non-functional resins.

The water-based base coat coating compositions may be physically drying or chemically crosslinking. Accordingly, the water-based coating compositions may contain crosslinking agents, such as, for example, free polyisocyanates. Selection of the optionally used crosslinking agents depends on the type of crosslinkable groups in the binders and is familiar to the person skilled in the art.

Preferably the water-based base coating compositions comprise water-dilutable polyurethane resins, optionally in combination with other water-dilutable resins, e.g. water-dilutable (meth)acrylic copolymers, and with dispersants, in particular the compositions comprise at least one water-reducible polyurethane/polyurea resin based on polycarbonate and/or polyester polyols. Most preferred the water-based base coating compositions comprise at least one water-reducible polyurethane/polyurea resin based on polycarbonate and/or polyester polyols in combination with at least one aqueous (meth)acrylic latex. Preferably the aqueous (meth)acrylic latex is prepared by multistage emulsion polymerization in the aqueous phase. Useful water-reducible polyurethane/polyurea resins based on polycarbonate polyols and on mixtures of polycarbonate and polyester polyols are described, for example, in EP 427 979 and EP 669 352. Useful aqueous (meth)acrylic lattices are described, for example, in WO 2006/118974.

The polyurethane/polyurea resins and aqueous (meth)acrylic lattices can be used in combination with pigment dispersants, in particular pigment dispersions based on graft copolymers.

Suitable pigment dispersants are described, for example, in U.S. Pat. No. 5,231,131.

The water-based base coat coating compositions contain conventional coating pigments, for example, special effect pigments (effect-imparting pigments) and/or color-imparting pigments selected from among white, colored and black pigments.

Special effect pigments impart to a coating a special effect, e.g. a color flop and/or lightness flop dependent on the angle of observation. Examples of those pigments are conventional effect pigments such as metal pigments. Example of metal pigments are those made from aluminum, copper or other metals, interference pigments such as, for example, metal oxide coated metal pigments, for example, iron oxide coated aluminum, coated mica such as, for example, titanium dioxide coated mica, pigments which produce a graphite effect, iron oxide in flake form, liquid crystal pigments, coated aluminum oxide pigments, coated silicon dioxide pigments. Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, perylene pigments The water-based base coat coating compositions may contain conventional coating additives in conventional quantities, for example, of 0.1 to 5 wt. %, relative to the solids content thereof. Examples are neutralizing agents, antifoaming agents, wetting agents, adhesion promoters, catalysts, levelling agents, anticratering agents, thickeners, rheology control agents, e.g. layered silicates and light stabilizers.

The water-based base coat coating compositions may contain conventional coating solvents, for example, in a proportion of preferably less than 20 wt. %, particularly preferably of less than 15 wt %.

Once the water-borne base coat composition has been applied and optionally dried or cured, the clear coat coating composition is applied in step II of the process of the present invention. The clear coat coating composition may here be applied onto the base coat layer either after drying or curing or after briefly flashing off, for example, at room temperature.

Once the clear coat coating composition has been applied to the substrate, the coating layer is exposed, optionally after a flash-off phase to UV radiation in step III. More preferred said coating layer is cured by exposing it to UV radiation emitted by UV radiation sources which substantially emit UV-A radiation.

Usable UV radiation sources are those emitting in the wavelength range from 180 to 420 nm, in particular from 200 to 400 nm. It goes without saying that UV radiation sources usually emit also in the wavelength range of visible light or infrared radiation. If desired filters can be used to reduce or eliminate those emissions. Examples of UV radiation sources are optionally doped high, medium and low pressure mercury vapour emitters, gas discharge tubes, such as low pressure xenon lamps, unpulsed UV lasers, and UV point source emitters, such as UV emitting diodes and black light tubes.

In addition to these continuously operating UV radiation sources, it is, however, also possible to use discontinuous UV radiation sources, for example pulsed UV lasers or "high energy flash installations" (known as UV flash lamps for short). The UV flash lamps may contain a plurality of flash tubes, for example, quartz tubes filled with inert gas such as xenon. The irradiation time with UV radiation when UV flash lamps are used as the UV radiation source may be, for example, in the range from 1 millisecond to 400 seconds, preferably from 4 to 160 seconds, depending on the number of flash discharges selected. The flashes may be triggered for example about every second. Curing may take place for example by means of 1 to 40 successive flash discharges. If continuous UV radiation sources are used, the irradiation time may be, for example, in the range from a few seconds to about 5 minutes, preferably less than 5 minutes.

Moreover, UV-A lamps, i.e. UV radiation sources which substantially emit UV-A radiation, can be used to cure the coating compositions of the present invention. A UV radiation source which substantially emits UV-A radiation is a UV radiation source which emits UV radiation having a UV-B:UV-A ratio of less than 1, preferably having a UV-B:UV-A ratio of less than 0.5, particularly preferably having a UV-B:UV-A ratio of less than 0.2, and which emits substantially no UV-C radiation.

The required spectral output (UV-B:UV-A ratio, substantially no UV-C radiation) of the UV radiation source can be generated by using a UV radiation lamp directly emitting UV radiation of the required wavelength in the required ratio or by using a conventional UV radiation source in combination with appropriate filters. For example, a particular filter can be used to generate UV radiation of a wavelength of 280-440 nm. The spectral output of a given radiation source can be measured with an energy dispersive spectrograph comprising a monochromator and light detector whereof the sensitivity is known at the relevant wavelengths. The ratio of UV-B:UV-A can be determined by integrating the intensities of spectral output in the respective wavelength ranges. Appropriate measuring instruments are commercially available and well known to a person skilled in the field of UV technology.

Suitable UV lamps which substantially emit UV-A radiation are commercially available. Examples of such suitable UV lamps are the UV lamp "UVA hand 250" from Dr. Hönle GmbH and the UV-F450 and UV-F900 from Panacol-Elasol GmbH. In principle the distance between the UV radiation sources and the substrate surface to be irradiated may be for example 2 to 60 cm. Usual radiation times are for example in the range of 1 to 5 minutes.

The coatings may be left after the irradiation operation to cure completely at room temperature, for example for 16 to 24 hours. It is also possible to perform complete curing at higher temperatures of, for example, 30 to 130° C., preferably of 40 to 80° C. Complete curing may take place by conventional methods, for example in a heated booth or by means of IR radiation. Depending upon the curing temperature, curing times of for example 1 to 60 minutes are possible. Thermal curing may, of course, also be performed before the UV irradiation phase or before and after the UV irradiation phase.

The coating compositions may be applied by means of conventional application methods, in particular, by spraying.

The process of the present invention prove particularly advantageous if curing proceeds substantially by irradiation with UV-A radiation, where the disruptive influence of atmospheric oxygen on free-radical polymerization is normally particularly evident and gives rise to unacceptable film surfaces. Furthermore the process of the present invention allows using UV radiation of lower intensity without taking disadvantages in film surface properties. Surprisingly it has been found that the presence of the organic phosphine derivative, in particular the presence of triphenyl phosphine, in the coating composition of the present invention lead to tack-free coatings that allow rapid further treatment, e.g., by polishing or sanding, while coating compositions of prior art containing, for example, triphenyl phosphites or other organic esters of phosphorous acid, and cured under same conditions lead to only tacky surfaces after irradiation with UV radiation, in particular after irradiation with UV-A radiation. In addition the process of the present invention allows to apply UV-curable clear coat coating compositions over water-based pigmented base coat coating compositions, where the initial yellowing usually observed with those multi-layer coatings can remarkably be reduced.

The process of the present invention can particularly be used in vehicle coatings, e.g. in car and transportation vehicle coatings.

Particularly advantageously, it can be used in repair coatings of vehicle bodies and parts thereof for repairing damage to the coated surface. But it can also be used for other industrial coating applications.

The following Examples are intended to illustrate the invention in greater detail.

EXAMPLES

Preparation Examples

Preparation of UV-Curable Clear Coat Compositions

Clear coat compositions have been prepared by mixing a clear base component and an activator component.

A clear base component has been prepared by mixing the following ingredients:
44.70% by weight of an polyester urethane with acryloyl groups (solids: 60% by weight in butylacetat), 26.04% by weight of Laromer 9013 (polyetheracrylate, 100%; from BASF), 3.43% by weight butylglycolacetat, 4.773% by weight butylacetat, 7.457% by weight ethylethoxypropionat, 10.556% by weight ethylacetat, 0.3% by weight of a light stabiliser (Tinuvin 123, CIBA), 0.35% by weight of a UV absorber (Tinuvin 400, CIBA), 0.55% by weight of a flow and levelling additive (Byk 361 N, BYK), 0.78% by weight of a photo-initiator (Darocur TPO, CIBA).

The polyester urethane with acryloyl groups has been prepared as follows: 901 g HDI-Isocyanurat (Tolonate® HDT from Rhodia) were stirred together with 260 g butylacetat, 1.2 g methyl hydrochinon and 1 g dibutyltin dilaurate solution (10%) and heated to 60° C. 365 g hydroxy ethylacrylate have been added while keeping the temperature at 80° C. at the most. It has been rinsed with 104 g butylacetat. After having reached an isocyanate number of 4.1% 211 g of trimethylol propane have been added. The reaction mixture has been kept at 80° C. until all isocyanate groups were reacted. Then the mixture has been diluted with butylacetat to a final solids content of 75.1% by weight. The urethane acrylat is characterised by a double bond functionality of 2, a calculated double bond equivalent weight of 498 and an OH-number of 120 mgKOH/g.

Different amounts of triphenylphosphine (TPP) have been added to the above clear base component according to Examples 1 to 4:

Example 1

0% by weight TPP (comparison)

Example 2

5% by weight TPP

Example 3

10% by weight TPP

Example 4

20% by weight TPP

The % by weight TPP are based on the amount of weight solids of the clear coat composition (clear base component+activator component).

Different amounts of comparative compounds of trivalent phosphorus had been added to the above clear base component according to comparative examples 5 to 10:

| Comp. Example | 5 | 6 | 7 | 8 | 9 | 10 |
|---|---|---|---|---|---|---|
| % by weight of TPPT | 5 | 10 | 20 | | | |
| % by weight of TPP/TPPT | | | | 5 | 10 | 20 |

TPPT: triphenylphosphit

TPP/TPPT: mixture of triphenylphosphine and triphenylphosphite in a ratio by weight of 3:1

The % by weight are based on the amount of weight solids of the clear coat composition (clear base component+activator component).

An activator component has been prepared by mixing 64.29% by weight of a hexamethylene diisocyanate trimer (Desmodur® 3390 BA/SN, 90% in butylacetat/hydrocarbon solvent 1:1; from Bayer) and 35.71% by weight butylacetat.

Clear coat compositions have been prepared by mixing 51.76 g of each of the clear base component of comparative example 1 (Comp CC1), of examples 2 to 4 (CC2 to CC4) and of each of the clear base component of comparative examples 5 to 10 (Comp CC5 to 10) with 8.24 g of the activator component prior to application.

Application of the Clear Coat Compositions

The clear coat compositions and comparative clear coat compositions were applied over water-based white basecoats (Standox® Standoblue Basecoat, RAL 9010-GL Reinweiss; from Standox GmbH); dry film thickness 21 μm, flash off time 20 minutes) in a resulting dry film thickness of 50 μm. After a flash-off phase of 5 minutes the resultant coatings have been irradiated with UVA radiation (Panacol UV-lamp 400 W) for 3 minutes at a distance of 40 cm.

The results achieved are shown in Tables 1 to 4.

TABLE 1

Tack and cross-linking density

|   |   | % | Tack without pressure 1' | Tack without pressure 5' | Tack with pressure 1' | Tack with pressure 5' | Polish-ing | x-linking density E' min [10 7 Pa] |
|---|---|---|---|---|---|---|---|---|
| 1 | TPP | 0 | 2 | 2 | 3 | 3 | nok | 0.9412 |
| 2 | TPP | 5 | 0.5 | 0.5 | 2 | 1 | nok | 1.069 |
| 3 | TPP | 10 | 0.5 | 0.5 | 1.5 | 1.5 | ok | 1.052 |
| 4 | TPP | 20 | 1 | 0.5 | 2 | 0.5 | ok | 0.7998 |

% = % by weight, x-linking density = cross-linking density

TABLE 2

Solvent resistance

|   |   |   | Butylacetat | | | Isopropanol | | |
|---|---|---|---|---|---|---|---|---|
|   |   | % | 4 h | 24 h | 1 week | 4 h | 24 h | 1 week |
| 1 | TPP | 0 | nok. | nok. | nok. | nok. | nok. | nok. |
| 2 | TPP | 5 | nok. | nok. | nok. | f.ok. | nok. | nok. |
| 3 | TPP | 10 | nok. | nok. | nok. | f.ok. | f.ok. | f.ok. |
| 4 | TPP | 20 | nok. | f.ok | ok.-f.ok. | f.ok. | f.ok. | ok.-f.ok. | nok. = not ok; f.ok = fairly ok, % = % by weight

TABLE 3

Tack and cross-linking density

|   |   | [%] | tack without pressure 1' | tack without pressure 5' | tack with preassure 1' | tack with preassure 5' | polish-ing | x-linking density E' min [10 7 Pa] |
|---|---|---|---|---|---|---|---|---|
| 5 | TPPT | 5 | wet | wet | wet | wet | nok |  |
| 6 | TPPT | 10 | 2 | 2 | 3 | 3 | nok |  |
| 7 | TPPT | 20 | wet | wet | wet | wet | nok | 0.6144 |
| 8 | TPP/TPPT | 5 | 1 | 1 | 2 | 1.5 | nok | 0.9828 |
| 9 | TPP/TPPT | 10 | 1 | 1 | 2 | 1.5 | nok | 0.9179 |
| 10 | TPP/TPPT | 20 | 1 | 1 | 1.5 | 0.5 | nok | 0.7502 |

% = % by weight, x-linking density = cross-linking density

TABLE 4

Solvent resistance

|   |   | Butylacetat | | | Isopropanol | | |
|---|---|---|---|---|---|---|---|
|   | % | 4 h | 24 h | 1 week | 4 h | 24 h | 1 week |
| TPPT | 5 | nok. | nok. | nok. | nok. | nok. | f.ok. |
| TPPT | 10 | nok. | nok. | nok. | nok. | nok. | nok. |
| TPPT | 20 | nok. | nok. | nok. | nok. | nok. | nok. |
| TPP/TPPT | 5 | nok. | nok. | nok. | nok. | nok. | nok. |
| TPP/TPPT | 10 | nok. | nok. | nok. | nok. | nok. | nok. |
| TPP/TPPT | 20 | nok. | nok. | nok. | nok. | f.ok. | f.ok. | nok. = not ok; f.ok = fairly ok, % = % by weight

The results clearly show that the multilayer coatings prepared with the clear coat compositions containing triphenylphosphine (Examples 2-4) have improved drying and curing properties as can be seen on the basis of the tack results and cross-linking density results. In particular important is that the clear coating compositions allow rapid further treatment by polishing.

The results also prove that the multilayer coatings prepared with the clear coat compositions containing triphenylphosphine have improved solvent resistance in comparison with multilayer coatings prepared with clear coat compositions containing triphenylphosphit or a combination of triphenylphosphine and triphenyl phosphit.

Test Methods:

Tack

The Tack is determined 1 and 5 minutes after the irradiation is completed by touching the coating with the thumb—once with and once without pressure. A rating of 0 corresponds to a tack free coating and a rating of 3 to tackiness.

Polishing

Polishing is carried out with a polish-machine (rotative) by using 3M polish-foam orange 09550 and a small amount of 3M Perfect-it III 80349. Impossible polishing or smears correspond to a nok result.

Cross-Linking Density

Cross-linking density is measured by dynamic mechanical analysis as described in W. Schlesing et al, Progress in Organic Coatings Volume 49, Issue 3, April 2004, Pages 197-208. E'=storage module Solvent Resistance Solvent resistance is measured 16 hours after curing by putting a solvent drunken cloth on top of the coating. This cloth is covered by a clock glass. The cloth is removed after 60 seconds. The result is assessed after 4 and 24 hours and after 1 week.

The invention claimed is:

1. A process for multilayer coating of substrates, comprising the steps:
    I) applying a layer of a water-based color-imparting and/or special effect-imparting base coat coating composition to a substrate,
    II) applying a layer of a clear coat coating composition curable by means of high energy radiation, and
    III) curing the clear coat layer by exposing it to high energy radiation, wherein the clear coat coating composition comprises:
        A) a hydroxyl-functional (meth)acryloyl functional polyurethane compound, a hydroxyl-functional (meth)acryloyl functional urethane compound, and a hydroxyl-functional (meth)acryloyl functional (meth)acrylic copolymer,
        A1) a polyisocyanate with free isocyanate groups,
        B) at least one photoinitiator, and
        C) triphenyl phosphine, wherein the clear coat coating composition comprises 3.0 to 40% by weight triphenyl phosphine.

2. The process of claim 1, wherein the clear coat coating composition curable by means of high energy radiation is in addition curable by at least one additional chemical curing reaction.

3. The process of claim 1, wherein the clear coat coating composition further comprises a triaryl phosphine.

4. The process of claim 2, wherein the clear coat coating composition further comprises a triaryl phosphine.

5. The process of claim 1, wherein the triphenyl phosphine is present in amounts of 5.0 to 30% by weight solids, based on the total amount of weight solids of component A).

6. The process of claim 1, wherein the triphenyl phosphine is present in amounts of about 20% by weight solids, based on the total amount of weight solids of component A).

7. The process of claim 1, wherein the clear coat coating composition further comprises:
   A3) at least one compound capable of free-radical polymerization having at least one olefinically unsaturated group and at least one isocyanate group.

8. The process of claim 7, wherein the triphenyl phosphine is present in amounts of 5.0 to 20% by weight solids, based on the total amount of weight solids of component A) and of component A3).

9. The process of claim 8, wherein the triphenyl phosphine is present in amounts of about 10% by weight solids, based on the total amount of weight solids of component A) and of component A3).

10. The process of claim 1, wherein the clear coat coating composition further comprises:
    A2) at least one compound with at least one hydroxyl group.

11. The process of claim 1, wherein the clear coat coating composition is free of organic phosphites.

12. The process of claim 1, wherein the substrate comprises a vehicle body or vehicle body parts.

13. The process of claim 1, wherein the photoinitiator is present in amounts of 0.4 to 3.0% by weight, based on the total amount of weight of the clear coat coating composition.

\* \* \* \* \*